(12) United States Patent
Viswanathan et al.

(10) Patent No.: US 12,105,139 B2
(45) Date of Patent: Oct. 1, 2024

(54) SECURE TESTING MODE

(71) Applicant: Advanced Micro Devices, Inc., Santa Clara, CA (US)

(72) Inventors: Vidyashankar Viswanathan, Boxborough, MA (US); Richard E. George, Santa Clara, CA (US); Michael Y. Chow, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 259 days.

(21) Appl. No.: 17/565,284

(22) Filed: Dec. 29, 2021

(65) Prior Publication Data
US 2023/0146154 A1    May 11, 2023

Related U.S. Application Data

(60) Provisional application No. 63/277,911, filed on Nov. 10, 2021.

(51) Int. Cl.
*G01R 31/28* (2006.01)
*G01R 31/317* (2006.01)
*G01R 31/3183* (2006.01)

(52) U.S. Cl.
CPC ....... *G01R 31/287* (2013.01); *G01R 31/2879* (2013.01); *G01R 31/31718* (2013.01); *G01R 31/318314* (2013.01)

(58) Field of Classification Search
None
See application file for complete search history.

(56) References Cited

U.S. PATENT DOCUMENTS

| | | | |
|---|---|---|---|
| 7,694,151 B1 * | 4/2010 | Johnson | G06F 21/14 |
| | | | 709/215 |
| 9,810,738 B2 * | 11/2017 | Tsuboi | G01R 31/3177 |
| 9,886,580 B2 * | 2/2018 | Dasar | G06F 9/4406 |
| 10,691,515 B2 * | 6/2020 | Lu | G06F 11/263 |
| 11,836,617 B2 * | 12/2023 | Carneiro | G06N 3/10 |
| 2015/0293173 A1 * | 10/2015 | Tsuboi | G06F 11/08 |
| | | | 714/727 |
| 2016/0245862 A1 * | 8/2016 | Grieco | G01R 31/318588 |
| 2020/0387790 A1 * | 12/2020 | Carneiro | G06F 11/3447 |
| 2023/0206368 A1 * | 6/2023 | Viswanathan | G06Q 50/184 |
| | | | 705/310 |

FOREIGN PATENT DOCUMENTS

JP        2017201736 A   * 11/2017

OTHER PUBLICATIONS

Translation of JP2017201736 A (Year: 2017).*

* cited by examiner

*Primary Examiner* — Jermele M Hollington
(74) *Attorney, Agent, or Firm* — Volpe Koenig

(57) ABSTRACT

A technique for operating a processing device is disclosed. The method includes irreversibly activating a testing mode switch of the processing device; in response to the activating, entering a testing mode in which normal operation of the processing device is disabled; receiving software for the processing device in the testing mode; based on whether the software is verified as testing mode-signed software, executing or not executing the software.

20 Claims, 4 Drawing Sheets

SECURE TESTING MODE

CROSS REFERENCE TO RELATED APPLICATIONS

This application claims priority to pending U.S. Provisional Patent Application Ser. No. 63/277,911, entitled "SECURE TESTING MODE," filed on Nov. 10, 2021, the entirety of which is hereby incorporated herein by reference.

BACKGROUND

Processing devices sometimes fail and be sent back to a manufacturer for testing. Identifying the reason for such failures is important in order to correct such errors and improve processors developed in the future. Techniques for facilitating such testing is therefore important.

BRIEF DESCRIPTION OF THE DRAWINGS

A more detailed understanding may be had from the following description, given by way of example in conjunction with the accompanying drawings wherein.

DETAILED DESCRIPTION

A technique for operating a processing device is disclosed. The method includes irreversibly activating a testing mode switch of the processing device; in response to the activating, entering a testing mode in which normal operation of the processing device is disabled; receiving software for the processing device in the testing mode; based on whether the software is verified as testing mode-signed software, executing or not executing the software.

Figure 1:
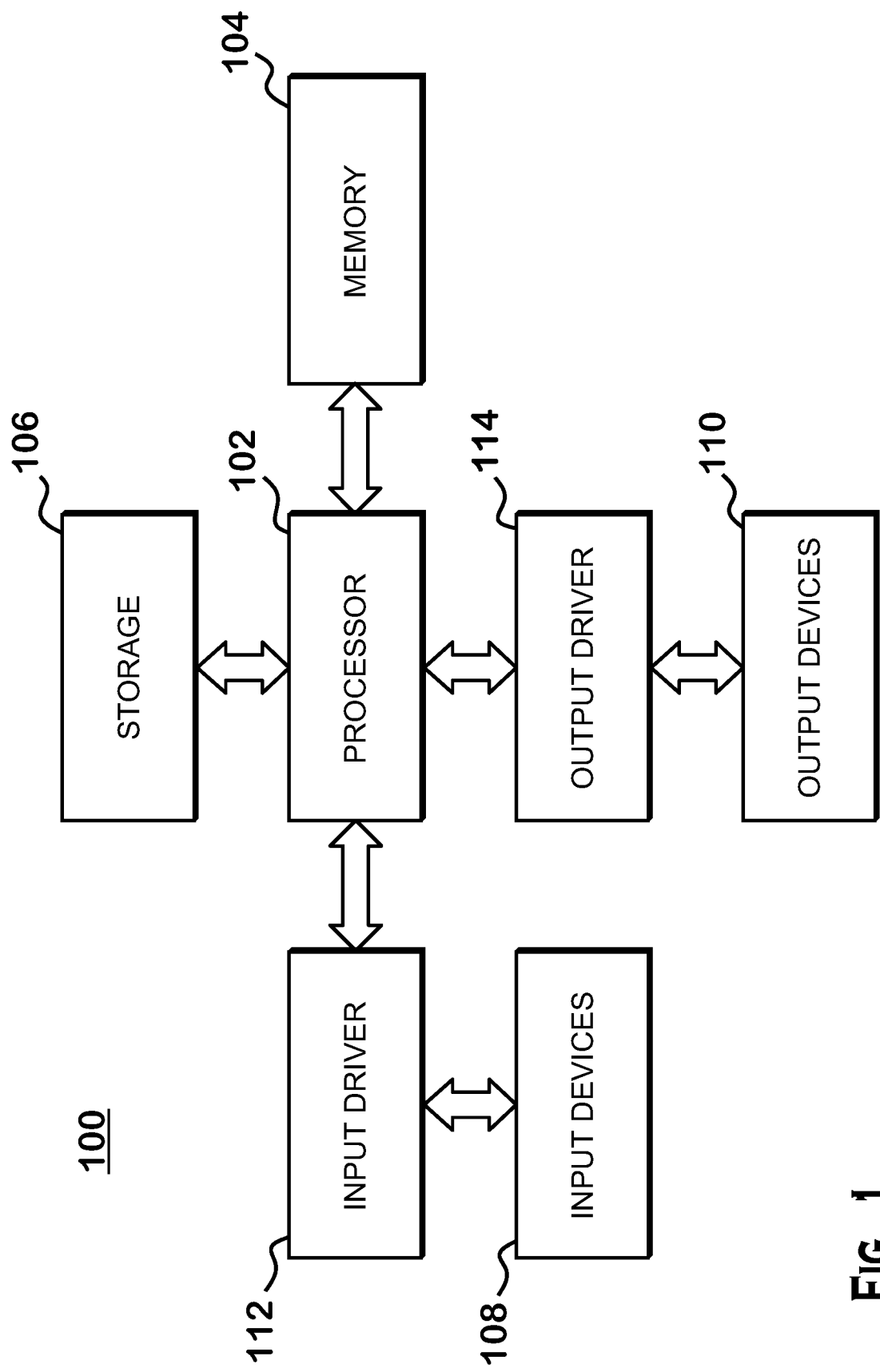
FIG. 1 is a block diagram of an example device in which one or more disclosed aspects may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Components such as the processor 102 sometimes fail while in use by an entity such as an end user or device manufacturer. In some situations, an entity such as the designer or manufacturer of the components re-acquires failed parts in order to determine the cause of the failure. In such situations, it is desirable to irreversibly disable normal operation of the processor 102, so that the parts cannot be found and reused after being discarded by the device manufacturer or designer when testing is completed. Thus, a mechanism is provided herein for irreversibly placing a device into a testing mode, wherein, in the testing mode, testing can be performed, but the device cannot be used for normal operation.

Figure 2:
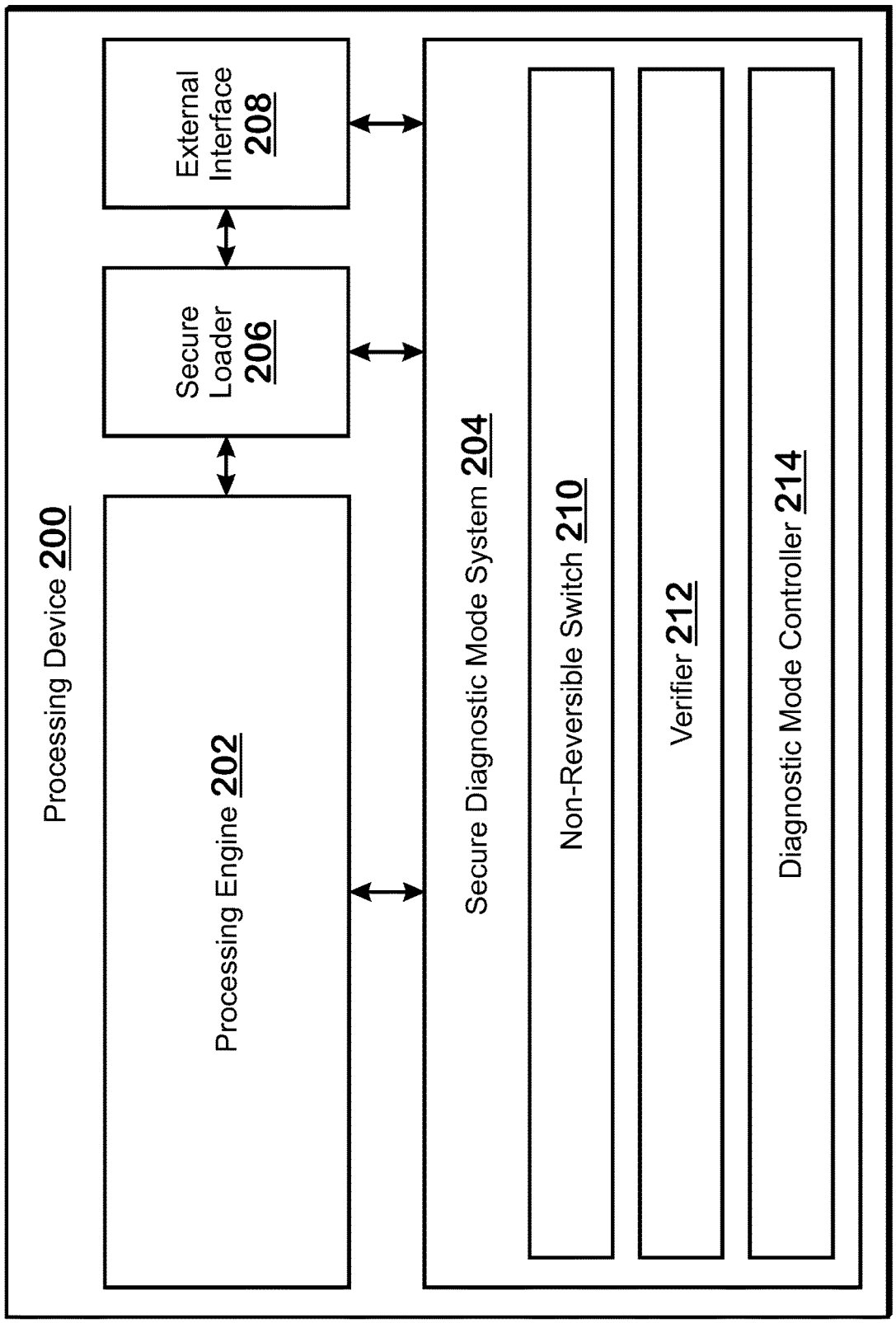
FIG. 2 illustrates a processing device capable of irreversibly entering into a testing mode, according to an example.

FIG. 2 illustrates a processing device 200 capable of irreversibly entering into a testing mode (as compared with a normal operation mode, in which the processing device 200 operates normally). Within the testing mode, the processing device 200 is capable of operating in either a secure diagnostic mode or an analysis mode. In the secure diagnostic mode, the processing device 200 is capable of operating with limited functionality and of executing a specially signed diagnostic image. The limited functionality includes that memory interfaces and input/output interfaces are not permitted to be accessed by the processing device 200. However, in the secure diagnostic mode, the processing engine 202 is allowed to execute specifically signed device software. In the analysis mode, the processing engine 202 does not execute, but a separate microcontroller (e.g., the diagnostic mode controller 214) is capable of executing specifically signed software. In addition, in the analysis mode, the processing device 200 is permitted to operate without the functional limitations of the secure diagnostic mode (e.g., the processing device 200 is able to access memory, input/output, and the like). In both of the secure diagnostic mode and the analysis mode, only software that is specially signed with a secure key can execute on the processing device 200. If software that is not signed with that key is attempted to be executed on the processing device 200, the processing device 200 will not execute that software. More specifically, in the normal operation mode, the processing device 200 will execute software signed with any of a normal mode set of keys. However, in the testing mode, software signed with at least a subset of that normal mode set of keys will not function. Instead, only software signed with one or a limited number of keys will function. Because entry into the testing mode is irreversible, when the processing device 200 is tested, for example, by the manufacturer, and then discarded, the processing device 200 cannot be obtained and reused in a normal operating mode.

The processing device 200 includes a processing engine 202, a secure diagnostic mode system 204, a secure loader 206, and an external interface 208. The secure diagnostic mode system 204 includes a non-reversible switch 210, a key verifier 212, and a diagnostic mode controller 214 for controlling the processing engine 202 or a separate microcontroller.

The processing engine 202 performs the main capabilities for the processing device 200. In an example (such as where the processing device 200 is the processor 102), the processing engine 202 includes one or more execution pipelines for executing instructions for software, with components such as instruction fetch, decode, execution, memory, and writeback, or similar functionality.

The external interface 208 receives instructions from a source external to the processing device 200 such as a memory (e.g., memory 104 or a firmware memory such as a firmware that stores unified extensible firmware interface ("UEFI") for bootloading) and verifies those instructions for execution on the processing device 200. In some examples, this verification occurs in an initial stage of operation such as during boot-loading for the processing device 200, but not after this point. In some examples, this verification occurs as a cryptographic verification, where the incoming instructions have been previously encrypted using a private key, and the secure loader 206 possesses a public key to decrypt and authenticate the incoming instructions.

The secure diagnostic mode system 204 cooperates with the secure loader 206 to permit or disallow normal operation of the processing device 200 in a normal mode. In the normal mode, properly signed arbitrary code is permitted to be executed by the processing engine 202, and the processing engine 202 is able to access any external resource such as memory, input/output devices, or other devices. Activating the non-reversible switch 210 causes the processing device 202 to operate in the testing mode. In some examples, activating the non-reversible switch 210 occurs by providing a special switch activation signal to the processing device 200 by a system external to the processing device 200. The secure diagnostic mode system 204 detects this switch activation signal (sometimes referred to as a "testing mode activation signal") and activates the non-reversible switch 210 in response.

In some examples, activating the switch to enter the testing mode involves determining that an appropriate input is received via the external interface 208. In some examples, this input is a command to enter the testing mode. In some examples, the diagnostic mode controller 214 verifies such input through, for example, cryptographic verification or by receiving verification data in addition to the command. If the verification does not succeed, then the diagnostic mode controller 214 does not cause the secure diagnostic mode system 204 to enter the testing mode and if the verification does succeed, then the diagnostic mode controller 214 does cause the secure diagnostic mode system 204 to enter the testing mode.

Entering the testing mode is irreversible. Thus, after the processing device 200 enters into the testing mode, the processing device 200 cannot be removed from the testing mode. In some examples, this irreversibility is facilitated with a fuse. When the fuse is blown, the processing device 200 is operating in testing mode and when the fuse is not blown, the processing device 200 is not operating in testing mode. In some examples, the diagnostic mode controller 214 causes the fuse to be blown in response to verifying the input for causing the processing device 200 to enter into the testing mode.

In the testing mode, an external system (such as a diagnostic mode tool, described in further detail elsewhere herein) provides one or more instructions to the secure loader 206 via the external interface 208. The secure loader interfaces with the verifier 212 of the secure diagnostic mode system 204. If the provided instructions are considered verified by the verifier 212, then the secure diagnostic mode system 204 allows the instructions to execute on the processing device 200.

In some implementations, the capabilities of the processing device 200 while in the testing mode depend on whether the processing device 200 is in the secure diagnostic mode or in the analysis mode. For example, some capabilities present in the secure diagnostic mode may not be present in the analysis mode, and some capabilities present in the analysis mode may not be present in the secure diagnostic mode. In some examples, in the secure diagnostic mode, the processing engine 202 is capable of executing signed and authenticated code but the processing engine 202 is not capable of executing any instructions in the analysis mode. In some examples, the instructions that can be executed on the processing engine 202 depends on whether the processing device 200 is in the secure diagnostic mode or in the analysis mode.

In some implementations, when the testing mode is first activated, the processing device 200 is placed into the secure diagnostic mode. Providing a further authentication signal places the processing device 200 into the analysis mode. In some examples, the further authentication signal is a predefined set of bits stored within the processing device 200 (e.g., within the verifier 212). In some examples, the further authentication signal is a password.

In the diagnostic mode, diagnostic functions are able to be executed at the request of instructions executed on the processing engine 202. In various examples, these diagnostic functions include a built in self test of various circuit elements in the device such as memory cells, logic cells, and the like. The diagnostic functions may also include checking of data crossing between clock and power domains, and checking the stability of analog circuits such as phase-locked loops. Additional diagnostics include other automated tests that load in a known sequence of inputs and compare the outputs with expected values. The goal of these diagnostics is to understand the reasons for a failure that may have occurred in order to address these failures. In the diagnostic mode, the processing device 200 operates with limited functionality. In some examples, the processing device 200 is unable to access system memory (e.g., memory 104), input/output devices (e.g., input devices 108 or output devices 110).

In the analysis mode, the processing device 200 operates with different functionality. In this mode, the processing device 200 is able to access system memory 104, input/output devices, and other functionality. However, in the analysis mode, the processing engine 202 is stalled and is unable to execute code. In the analysis mode, specific signed diagnostic firmware is allowed to run on a secure microcontroller such as the diagnostic mode controller 214.

In either the diagnostic mode or the analysis mode, if the provided instructions are not considered verified by the verifier 212, then the secure diagnostic mode system 204 does not allow the processing device 200 to execute those instructions.

Figure 3:
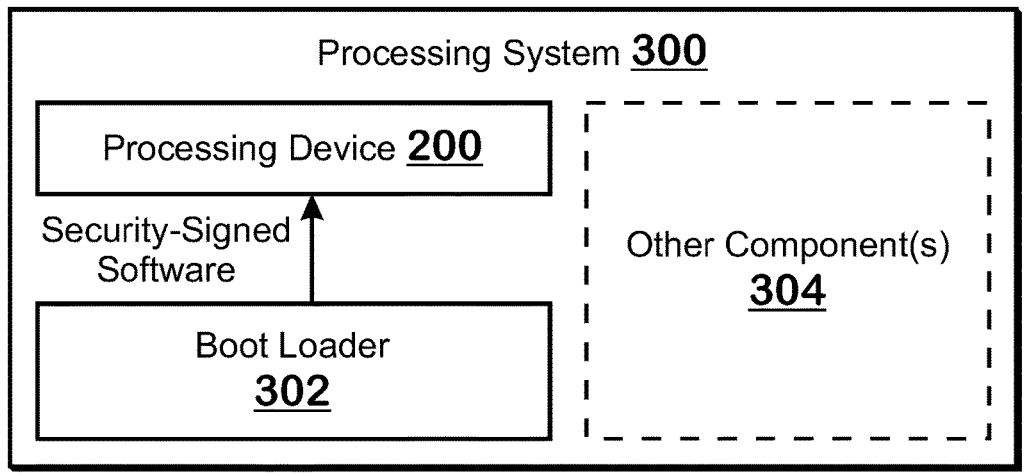
FIG. 3 illustrates normal operation of the processing device, according to an example.
Figure 4:
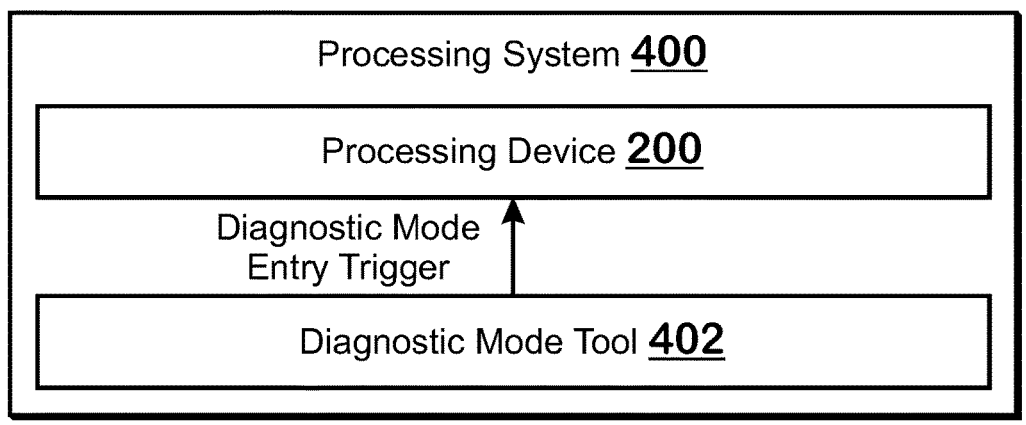
FIG. 4 illustrates entry of the processing device into a testing mode, according to an example.
Figure 5:
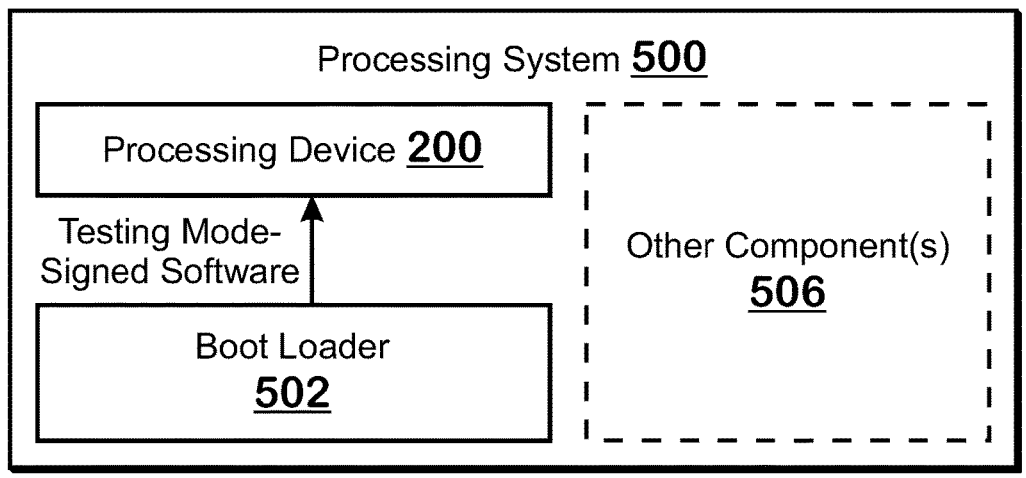
FIG. 5 illustrates operation of a processing system in the testing mode, according to an example.

FIGS. 3-5 illustrate operations associated with booting a processing system, according to examples.

FIG. 3 illustrates normal operation of the processing device, according to an example. A processing system 300 includes the processing device 200, a boot loader 302, and one or more other components 304. The non-reversible switch 210 (FIG. 2) of the processing device 200 in FIG. 3 has not been activated. Thus the processing device is operating in the normal mode, and not the testing mode.

In the normal mode, upon boot up, the boot loader 302 provides software to the processing device 200 for execution. The software is securely-signed software. The processing device 200 verifies the security signature. In an example, the security signature is embodied as encryption of the software by a private key. The processing device 200 possesses the corresponding public key and uses that key to decrypt the software. The processing device 200 checks the integrity of the software (e.g., via some form of bit-based check) after decryption and executes the software if the software is deemed satisfactory. In various examples, the processing device 200 stores multiple public keys, as it is possible for software to be signed with different keys.

In FIG. 3, the other components 304 are any technically feasible components, such as the components of the system 100 of FIG. 1, other than the processor 102.

FIG. 4 illustrates entry of the processing device into a testing mode, according to an example. A diagnostic mode tool 402 provides a testing mode activation signal (e.g., diagnostic mode entry trigger) to the processing device 200. In response, the processing device 200 activates the non-reversible switch 210. This irreversibly places the processing device 200 into a testing mode. As described elsewhere herein, the testing mode activation signal includes a password or other verifiable item of data. The processing device 200 verifies this item of data to determine that it is a proper request to enter the testing mode. In the instance shown, the processing device 200 determines that the request is proper and therefore enters the testing mode. However, in situations where the request is not proper, the processing device 200 does not enter the testing mode. In various examples, the testing mode activation signal is triggered by human interaction or by a signal provided by an external testing device.

FIG. 5 illustrates operation of a processing system 500 in the testing mode, according to an example. A boot loader 502 provides testing mode-signed software to the processing device 200. The testing mode-signed software is software signed with a special key that unlocks operation of the processing device 200 in the testing mode. In some implementations, the key with which the testing mode-signed software is signed is not the same key as the key with which the securely-signed software of FIG. 3 is signed.

FIG. 5 represents operation in either the secure diagnostic mode or the analysis mode. In either mode, software that is to be executed must be signed with the testing mode-signed software. Other components 506 are shown. These other components can include any technically feasible components, such as any of the components of FIG. 1 other than the processor 102, as well as diagnostic tools, such as signal generators, pattern generators, interfaces to external instrumentation such as oscilloscopes, data loggers, voltage, current, and temperature sensors, and other components.

The processing system 300 of FIG. 3 is a "normal" computing system such as a computing device (desktop, laptop, mobile device, gaming console, or any other normal computing system). The processing system 400 of FIG. 4 is a diagnostic system having one or more diagnostic tools for analyzing the processing device 200. The processing system 500 is also a diagnostic system. In some examples, the processing system 400 is the same as the processing system 500, although in other examples, these are not the same. In some examples, a processing device 200 is first placed into testing mode in one processing system (e.g., processing system 400) and subsequently placed into another processing system (e.g., processing system 500) for testing and analysis. After testing and analysis is complete, the processing device 200 may be discarded, and cannot be reused in a "normal" processing system (e.g., processing system 300), since normal operation of the processing device 200 is permanently disabled, and execution of instructions in the testing mode requires special testing mode-signed software that is not generally available to the public.

Figure 6:
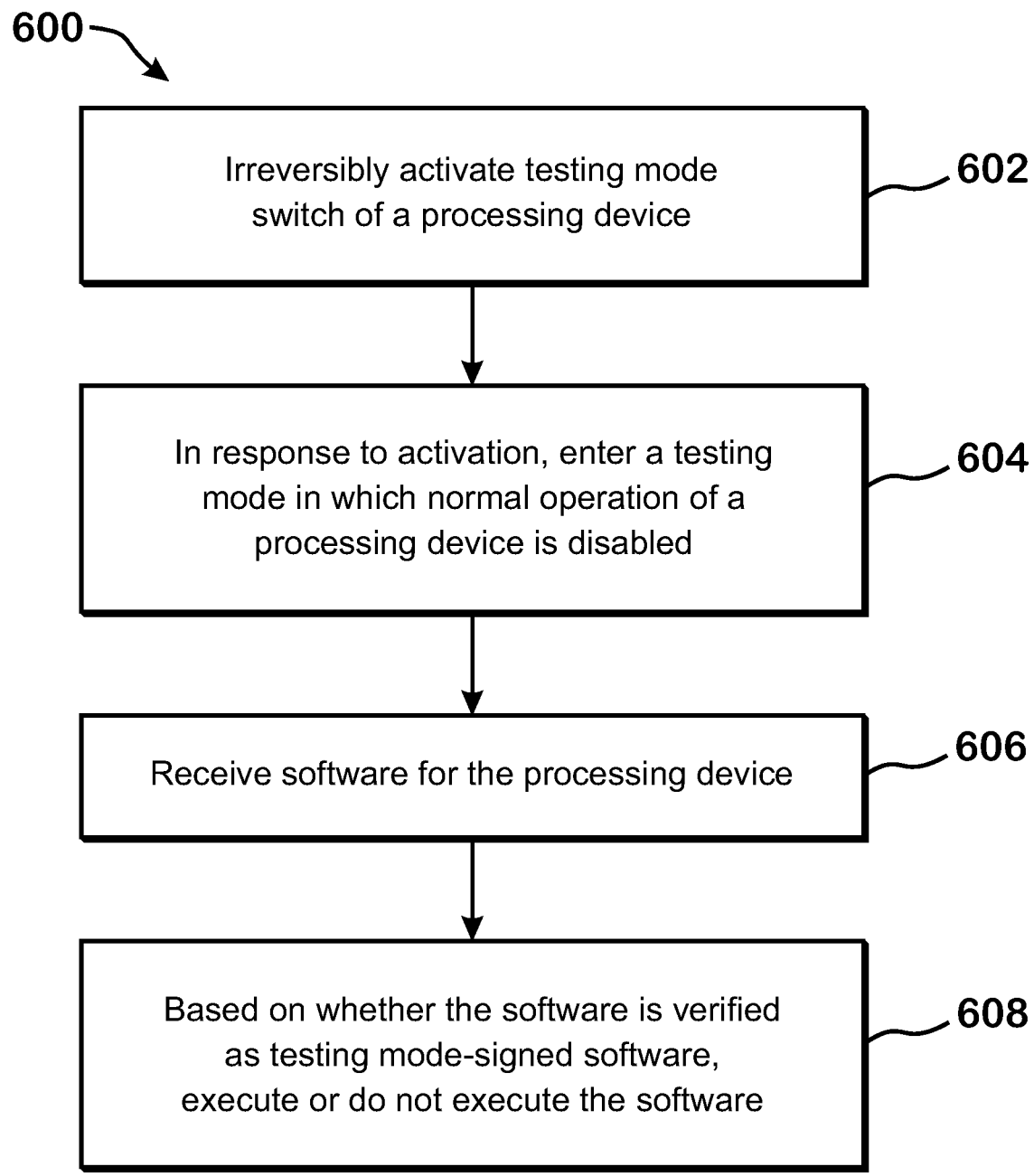
FIG. 6 is a flow diagram of a method for performing testing operations, according to an example.

FIG. 6 is a flow diagram of a method 500 for performing testing operations, according to an example. Although described with respect to the system of FIGS. 1-5, those of skill in the art will understand that any system, configured to perform the steps of the method 500 in any technically feasible order falls within the scope of the present disclosure.

The method 600 begins at step 602, where a processing device 200 irreversibly activates a testing mode switch. In some examples, this step includes blowing a fuse. In some examples, this step involves receiving a testing mode activation command. In some examples, the step also involves verifying that the testing mode activation command is appropriate. In some examples, verifying that the testing mode activation command is appropriate includes determining that the command is cryptographically signed according to a pre-specified private key (for example, by successfully decrypting the command via a public key).

At step 604, in response to the activation, the processing device 200 enters a testing mode in which normal operation of a processing device is disabled. Normal operation of the processing device being disabled means that arbitrary software cannot be executed on the processing device 200. Only software signed with a special testing mode key can be executed. Such software is generally not publicly available and thus no publicly available system will cause the processing device 200 to function. In addition, the software that can execute with the special testing mode key is, in some implementations, limited in functionality. For instance, in some examples, the software is not capable of accessing certain entities such as system memory 104 or input/output devices.

At step 606, the processing device 200 receives software to execute. At step 608, the processing device 200 executes or does not execute the software based on whether the software is verified as testing mode-signed software. In the event that the software is verified in such a manner, the processing device 200 executes the software and in the event that the software is not verified in such a manner, the processing device 200 does not execute the software. In some examples, verifying the software as being properly digitally signed includes attempting to decrypt the software using a public key. In the event that the software is successfully decrypted, the processing device verifies the software and in the event that the software is not successfully decrypted, the processing device does not verify the software.

It should be understood that many variations are possible based on the disclosure herein. Although features and elements are described above in particular combinations, each feature or element may be used alone without the other features and elements or in various combinations with or without other features and elements.

Various elements described herein are implemented as circuitry that performs the functionality described herein, as software executing on a processor, or as a combination thereof. In FIG. 1, the processor 102 is a computer processor that performs the operations described herein. The input driver 112, output driver 114, input devices 108, and output devices 110 are software executing on one or more processors, hardware, or a combination thereof. The various elements of the instruction pipeline 200 are hardware circuits. The processing engine 202, secure loader 206, external interface 206, secure diagnostic mode system 204, non-reversible switch 210, verifier 212, processing system 300, processing system 400, processing system 500, diagnostic mode tool 402, boot loader 302, boot loader 502, and diagnostic mode controller 214 are implemented as hardwired circuits or as processors configured to execute software to implement the operations described herein.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, a graphics processor, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a processing device, the method comprising:
   irreversibly activating a testing mode switch of the processing device;
   in response to the activating, entering a testing mode in which normal operation of the processing device is disabled, the irreversibly activating the testing mode permanently preventing return to the normal operation;
   receiving software for the processing device in the testing mode; and
   based on whether the software is verified as testing mode-signed software, executing or not executing the software,
   wherein the irreversibly activating the testing mode permanently prevents the processing device returning to the normal operation.

2. The method of claim 1, wherein activating the testing mode switch includes receiving a command to activate the testing mode switch.

3. The method of claim 2, wherein activating the testing mode switch includes verifying that the command to activate the testing mode switch is considered verified.

4. The method of claim 1, wherein activating the testing mode switch includes blowing a fuse that is in communication with a secure diagnostic mode system configured to cause the testing mode to be entered into.

5. The method of claim 1, wherein normal operation of the processing device includes executing software that is not considered testing mode- signed software.

6. The method of claim 1, wherein executing or not executing the software, based on whether the software is verified as testing mode-signed software includes determining that the software is testing mode-signed software and in response, executing the software.

7. The method of claim 6, wherein determining that the software is testing mode-signed software comprises successfully decrypting the software using a testing mode key.

8. The method of claim 7, wherein the testing mode key is different than a key that allows execution in the normal operation.

9. The method of claim 6, wherein executing or not executing the software, based on whether the software is verified as testing mode-signed software includes in response to determining that the software is not verified as testing mode- signed software, refusing to execute the software.

10. A system, comprising:
    a processing engine; and
    a secure diagnostic mode system configured to:
       irreversibly activate a testing mode switch;
       in response to the activating, enter a testing mode in which normal operation of the processing engine is disabled;
       receive software for the testing mode; and
       based on whether the software is verified as testing mode-signed software, causing the software to execute or preventing the software from executing,
       wherein the irreversibly activating the testing mode permanently prevents the processing engine returning to the normal operation.

11. The system of claim 10, wherein activating the testing mode switch includes receiving a command to activate the testing mode switch.

12. The system of claim 11, wherein activating the testing mode switch includes verifying that the command to activate the testing mode switch is considered verified.

13. The system of claim 10, wherein activating the testing mode switch includes blowing a fuse in communication with the secure diagnostic mode system.

14. The system of claim 10, wherein normal operation of the processing engine includes executing software that is not considered testing mode-signed software.

15. The system of claim 10, wherein executing or not executing the software, based on whether the software is verified as testing mode-signed software includes determining that the software is testing mode-signed software and in response, executing the software.

16. The system of claim 15, wherein determining that the software is testing mode-signed software comprises successfully decrypting the software using a testing mode key.

17. The system of claim 16, wherein the testing mode key is different than a key that allows execution in the normal operation.

18. The system of claim 15, wherein executing or not executing the software, based on whether the software is verified as testing mode-signed software includes in response to determining that the software is not verified as testing mode-signed software, refusing to execute the software.

19. A system, comprising:
   a boot loader; and
   a processing device, comprising:
      a processing engine; and
      a secure diagnostic mode system configured to:
         irreversibly activate a testing mode switch;
         in response to the activating, enter a testing mode in which normal operation of the processing engine is disabled;
         receive software for the testing mode from the boot loader; and
         based on whether the software is verified as testing mode-signed software, causing the software to execute or preventing the software from executing, and
         wherein the irreversibly activating the testing mode permanently prevents the processing device returning to the normal operation.

20. The system of claim 19, wherein activating the testing mode switch includes receiving a command to activate the testing mode switch.

* * * * *